US007204794B2

(12) United States Patent
Rea et al.

(10) Patent No.: US 7,204,794 B2
(45) Date of Patent: Apr. 17, 2007

(54) MACHINE AND METHOD FOR MAKING FILTER BAGS FOR INFUSION PRODUCTS

(75) Inventors: Dario Rea, Monterenzio (IT); Sauro Rivola, Riolo Terme (IT); Giorgio Manaresi, Ozzano Emilia (IT)

(73) Assignee: I.M.A. Industria Macchine Automatiche S.p.A., Bologna (IT)

( * ) Notice: Subject to any disclaimer, the term of this patent is extended or adjusted under 35 U.S.C. 154(b) by 0 days.

(21) Appl. No.: 10/502,653

(22) PCT Filed: Nov. 12, 2003

(86) PCT No.: PCT/IB03/05141
§ 371 (c)(1),
(2), (4) Date: Aug. 3, 2004

(87) PCT Pub. No.: WO2004/054880

PCT Pub. Date: Jul. 1, 2004

(65) Prior Publication Data
US 2005/0118303 A1  Jun. 2, 2005

(30) Foreign Application Priority Data
Dec. 18, 2002  (IT) ............ BO2002A0798

(51) Int. Cl.
B31B 1/86    (2006.01)
B65B 61/14   (2006.01)
(52) U.S. Cl. ............ 493/375; 493/198; 493/209; 493/221; 493/226; 493/941; 493/961; 53/134.2; 53/413
(58) Field of Classification Search ............ 493/186, 493/189, 193, 195, 196, 198, 201, 209, 210, 493/221, 226, 375, 379, 961, 941; 53/134.2; 53/413
See application file for complete search history.

(56) References Cited
U.S. PATENT DOCUMENTS
2,861,403 A * 11/1958 Weisman ............ 53/413

(Continued)

FOREIGN PATENT DOCUMENTS
JP    10-157710    6/1998

OTHER PUBLICATIONS
WO 95/10462 published Apr. 20, 1995.
WO 01/05662 A1 published Jan. 25, 2001.

Primary Examiner—Christopher Harmon
(74) Attorney, Agent, or Firm—Arent Fox PLLC

(57) ABSTRACT

A machine (1) for making filter bags (4) of tetrahedral shape for infusion products comprises a revolving conveyor drum (15) driven by a first drive shaft (16) to feed a web (5) of filter paper along a path (P) on which there are positioned: a station (25) for feeding the filter paper web (5); a station (21) for feeding a succession of tags (6); a station (22) for feeding tie string (7) connecting the filter bags (4) to the respective tags (6); a station (23) for arranging the tie string (7) according to a defined pattern on the path (P); and a plurality of sealers (24) facing the path (P) to attach the tie string (7) and the tags (6) to the filter paper web (5). The sealers (24) perform a defined movement between a sealing position and a waiting position, and this movement, which is performed simultaneously and synchronously by all the sealers (24), is imparted, through a transmission element (39) shared by all the sealers (24), by a second cam drive shaft (36) connected to the same source of motion (18) to which the first shaft (16) that drives the conveyor drum (15) is connected.

16 Claims, 6 Drawing Sheets

U.S. PATENT DOCUMENTS

| | | | |
|---|---|---|---|
| 3,774,369 A * | 11/1973 | Klar | 53/134.2 |
| 3,805,483 A * | 4/1974 | Romagnoli | 53/134.2 |
| 3,969,873 A * | 7/1976 | Klar | 53/134.2 |
| 5,511,359 A * | 4/1996 | Kenney | 53/413 |
| 5,632,132 A * | 5/1997 | Kuipers et al. | 53/413 |
| 5,689,936 A | 11/1997 | Kenney | |
| 5,863,575 A * | 1/1999 | Kuipers et al. | 426/80 |
| 5,873,216 A * | 2/1999 | Appelbe et al. | 53/413 |
| 5,951,452 A * | 9/1999 | Stevenson | 493/193 |
| 5,979,144 A | 11/1999 | Bailey et al. | |
| 6,511,410 B1 * | 1/2003 | Ketel et al. | 493/375 |
| 6,571,537 B2 * | 6/2003 | Ghirlandi | 53/413 |

* cited by examiner

MACHINE AND METHOD FOR MAKING FILTER BAGS FOR INFUSION PRODUCTS

CROSS-REFERENCE TO RELATED APPLICATION

This application is a National Stage entry of International Application No. PCT/IB2003/005141, filed Nov. 12, 2003, the entire specification claims and drawings of which are incorporated herewith by reference.

TECHNICAL FIELD

The present invention relates to a machine and method for making filter bags for infusion products such as tea, camomile and the like.

In particular, this invention applies to the production of filter bags of three-dimensional shape such as tetrahedral or pyramidal filter bags, to which this specification refers but without restricting the scope of the invention, with pick-up tags connected to the filter bags by means of tie strings.

BACKGROUND ART

At present, three-dimensional filter bags with tags and tie strings are usually made from a flat web of filter paper on which charges of infusion product are placed. The filter paper is then folded around the charge of infusion product and sealed longitudinally to form a continuous tube enclosing the charges of infusion product.

Next, the tube is sealed crossways at regular intervals and cut crossways at the seals to form individual filter bags.

Normally, in this method, the tags and tie strings are applied after the continuous tube has been completely formed, that is to say, once the charges of product have been placed inside it and the crossways seals have been made.

The tags and tie strings are applied by heat sealers located at operating stations forming part of the filter bag making machine that embodies the method described above. These sealers have inherent drawbacks created by their complex, cumbersome drive mechanisms.

The complexity and bulky size of the sealers are due not only to the fact that a large number of sealers are required but also, and especially, to the fact that the sealers have to work in the space around the filter bags after these have been formed.

DISCLOSURE OF THE INVENTION

The present invention has for an object to provide a machine for making filter bags that overcomes the above mentioned drawbacks.

Another object of the invention is to overcome the above mentioned drawbacks by providing a machine for making filter bags for infusion products where the sealer drive mechanisms present a simple, compact structure.

Accordingly, the present invention provides a machine for making filter bags for infusion products, each filter bag being made from a flat web of filter paper and having applied to it a tag and a tie string connecting the tag to the filter bag, the machine being characterised in that it comprises: conveyor means for feeding the flat web of filter paper along at least part of a first path defined by the conveyor means themselves; first drive means for imparting motion to the conveyor along the first path; a first station for feeding the flat web of filter paper to the first path; a second station for feeding a succession of the tags to the first path; a third station for feeding the tie string to the first path; a fourth station for arranging the tie string according to a defined pattern on the first path; sealing means facing the first path and designed to attach the tie string, arranged according to said pattern, and the tags to each other and to the flat web of filter paper by sealing; second drive means for imparting to the sealing means a defined motion towards and away from a sealing position; a source of motion shared by the first and second drive means; and means for forming the filter bags from the flat web of filter paper to which the tags and tie string have already been applied.

This invention also provides a method for making filter bags for infusion products, each filter bag being made from a flat web of filter paper having applied to it a tag and a tie string connecting the tag to the filter bag, the method being characterised in that it comprises the steps of conveying the flat web of filter paper along a first defined path; feeding a succession of the tags to the first path; feeding the tie string to the first path; arranging the tie string according to a defined pattern on the first path; attaching the tie string, arranged according to said pattern, and the tags to each other and to the flat web of filter paper by sealing; forming the filter bags from the flat web of filter paper to which the tags and tie string have already been applied.

DESCRIPTION OF THE DRAWINGS

The advantages of the invention will become more apparent from the following detailed description provided by way of example with reference to the accompanying drawings which illustrate a preferred, non-restricting embodiment of the filter bag making machine and in which.

DETAILED DESCRIPTION OF THE PREFERRED EMBODIMENTS OF THE INVENTION

Figure 1:
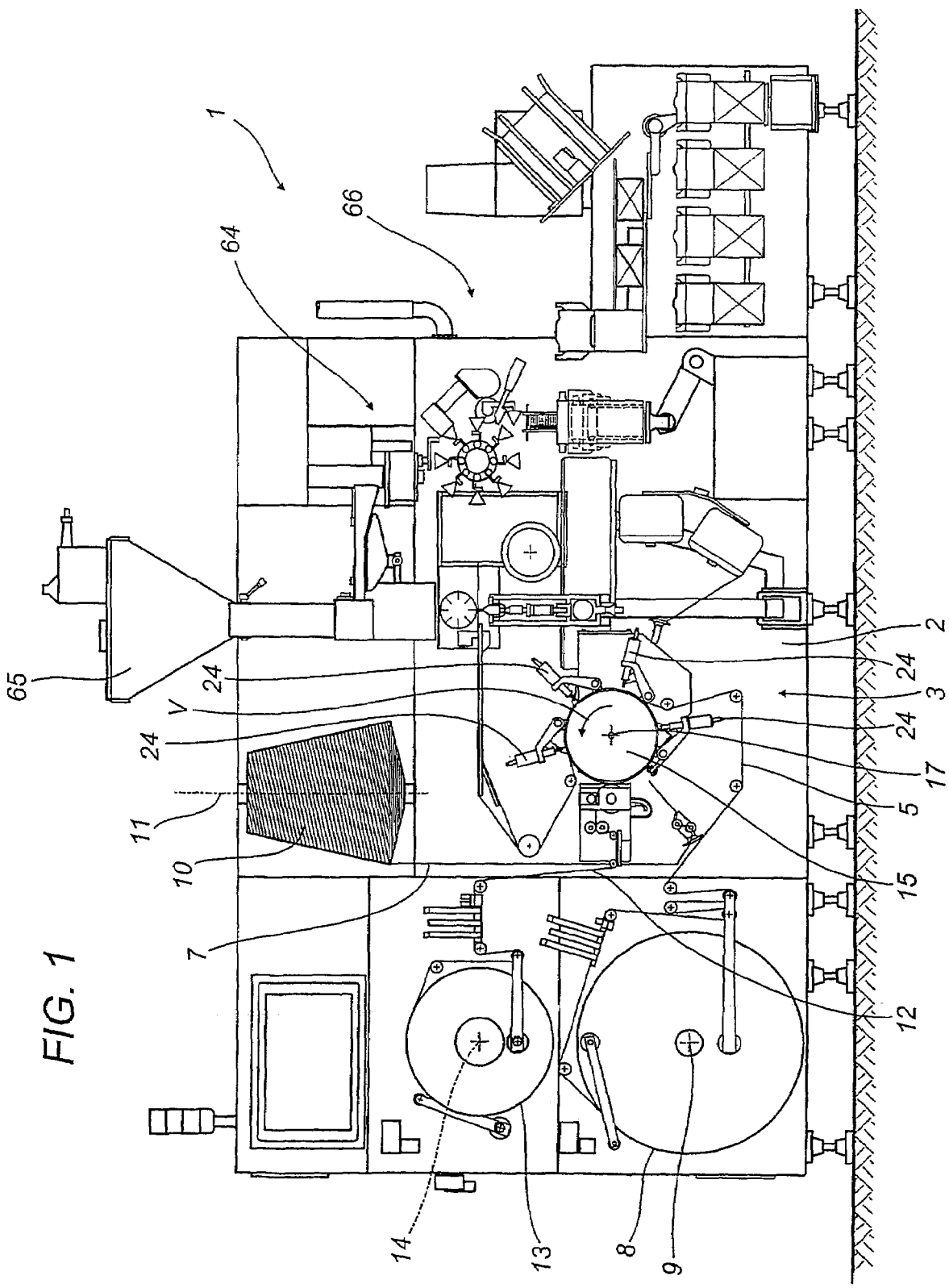
FIG. 1 is a schematic front view, partly in cross section and with some parts cut away for clarity, of the machine according to the invention, for making filter bags for infusion products.

With reference to FIG. 1, the numeral 1 denotes in its entirety a machine for packaging infusion products such as tea, camomile and the like, on a central portion of whose frame 2 there is mounted an operating unit 3 for making filter bags 4 of tetrahedral or pyramidal shape.

Figure 6:
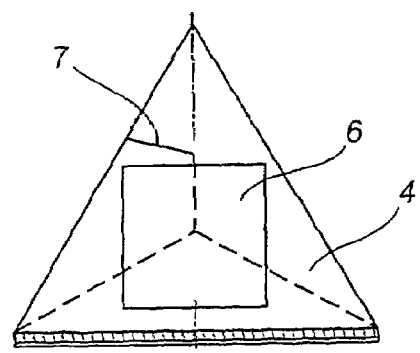
FIG. 6 illustrates a filter bag of tetrahedral or pyramidal, shape made by the machine of FIG. 1.
Figure 7:
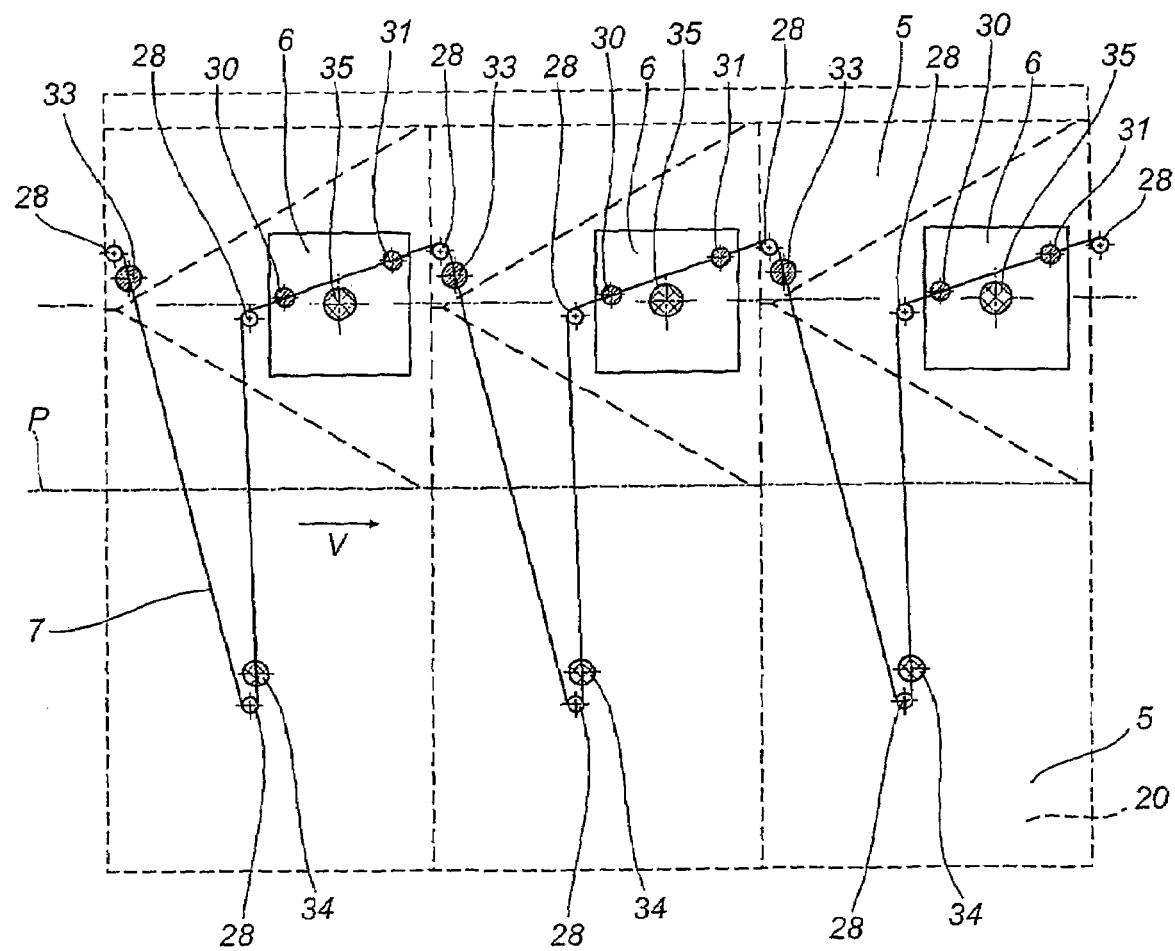
FIG. 7 is a schematic representation, according to a planar development, of how of the unit illustrated in FIGS. 2 to 5 operates.

As illustrated in FIGS. 6 and 7, each filter bag 4 is made from a flat web 5 of filter paper and has applied to it a tag 6 and a tie string 7 connecting the tag 6 to the filter bag 4.

As illustrated in FIG. 1, the web 5 and the tie string 7 are unwound, respectively, from a roll 8 whose axis 9 is horizontal and from a spool 10 whose axis 11 is vertical, both rotatably mounted on the frame 2. The tags 6, on the other hand, are made by transversely cutting a tape 12 unwound from a roll 13 whose axis 14 is parallel to the axis 9, and which is rotatably mounted on the frame 2 above the roll 8.

As illustrated in FIGS. 1 to 5, the unit 3 comprises a revolving conveyor drum 15, which is mounted coaxially on a drive shaft 16 whose axis 17 is parallel to the axis 9.

Figure 2:
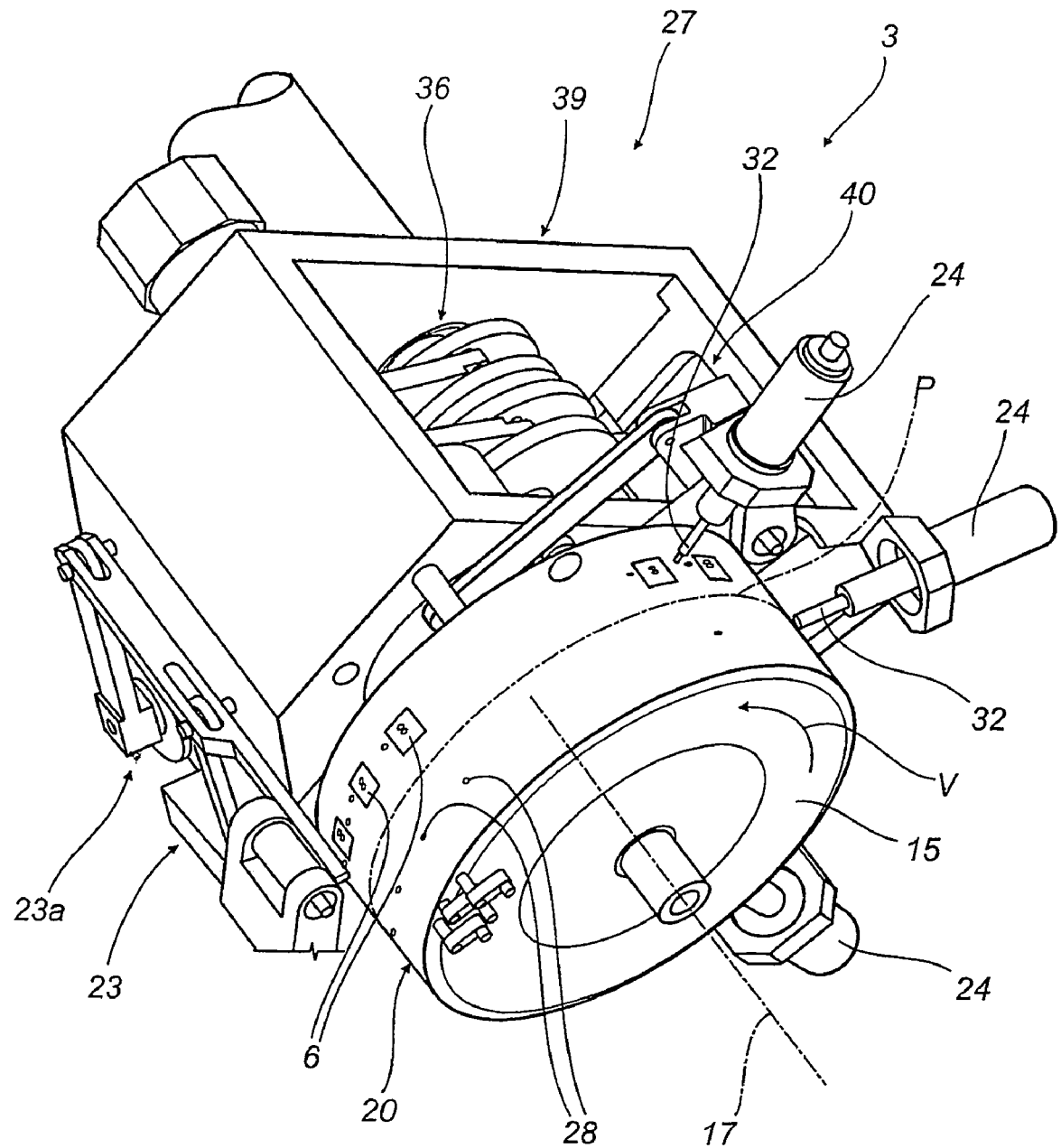
FIG. 2 is a perspective view of an operating unit forming part of the machine of FIG. 1.
Figure 3:
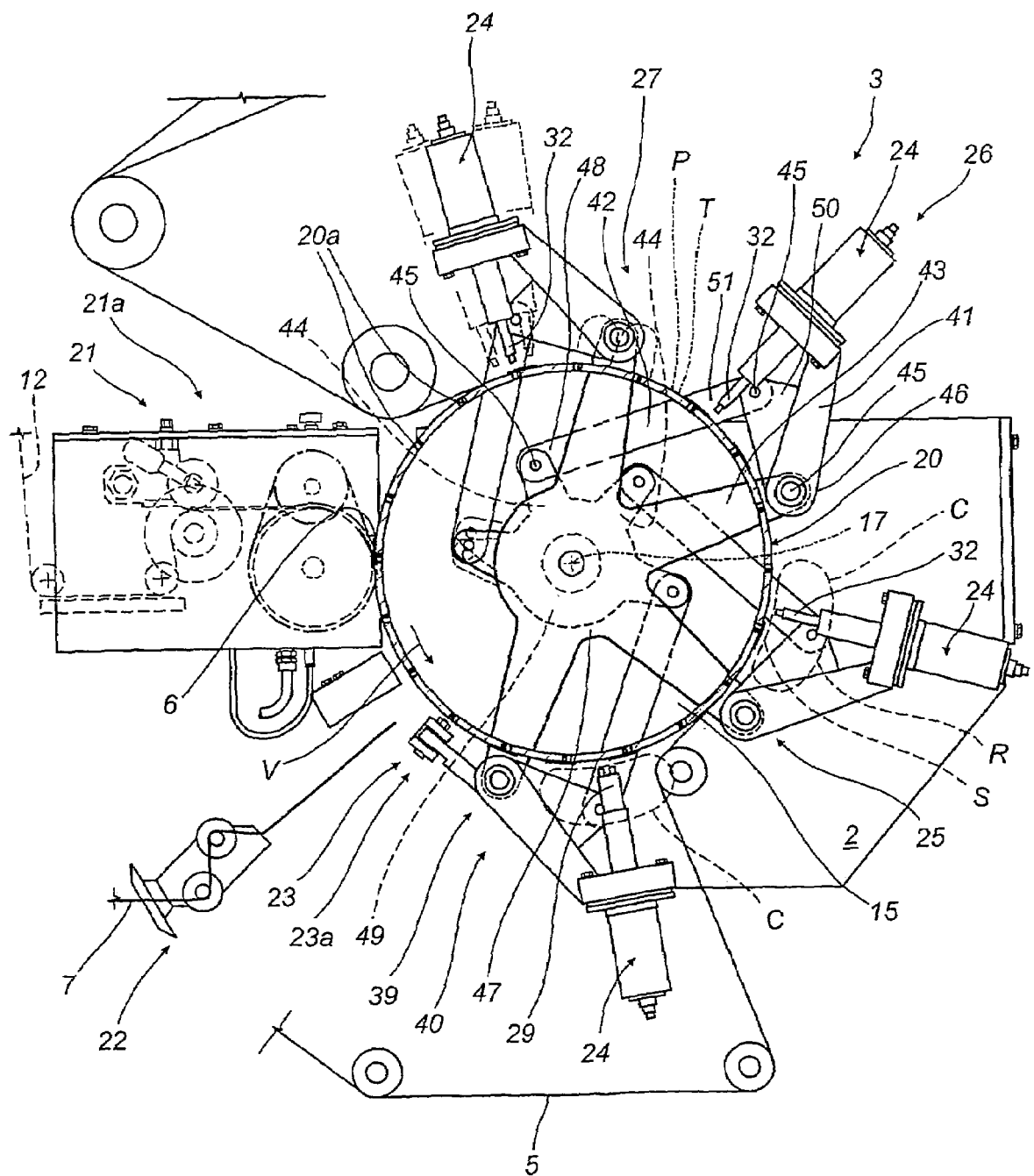
FIG. 3 is a schematic front view of the operating unit of FIG. 2.

The drum 15 and the shaft 16 are made to rotate symmetrically about the axis 17, in an anticlockwise direction V in FIGS. 2 and 3, by a source of motion 18 to which the shaft 16 is connected and which rotates as one with it.

Figure 4:
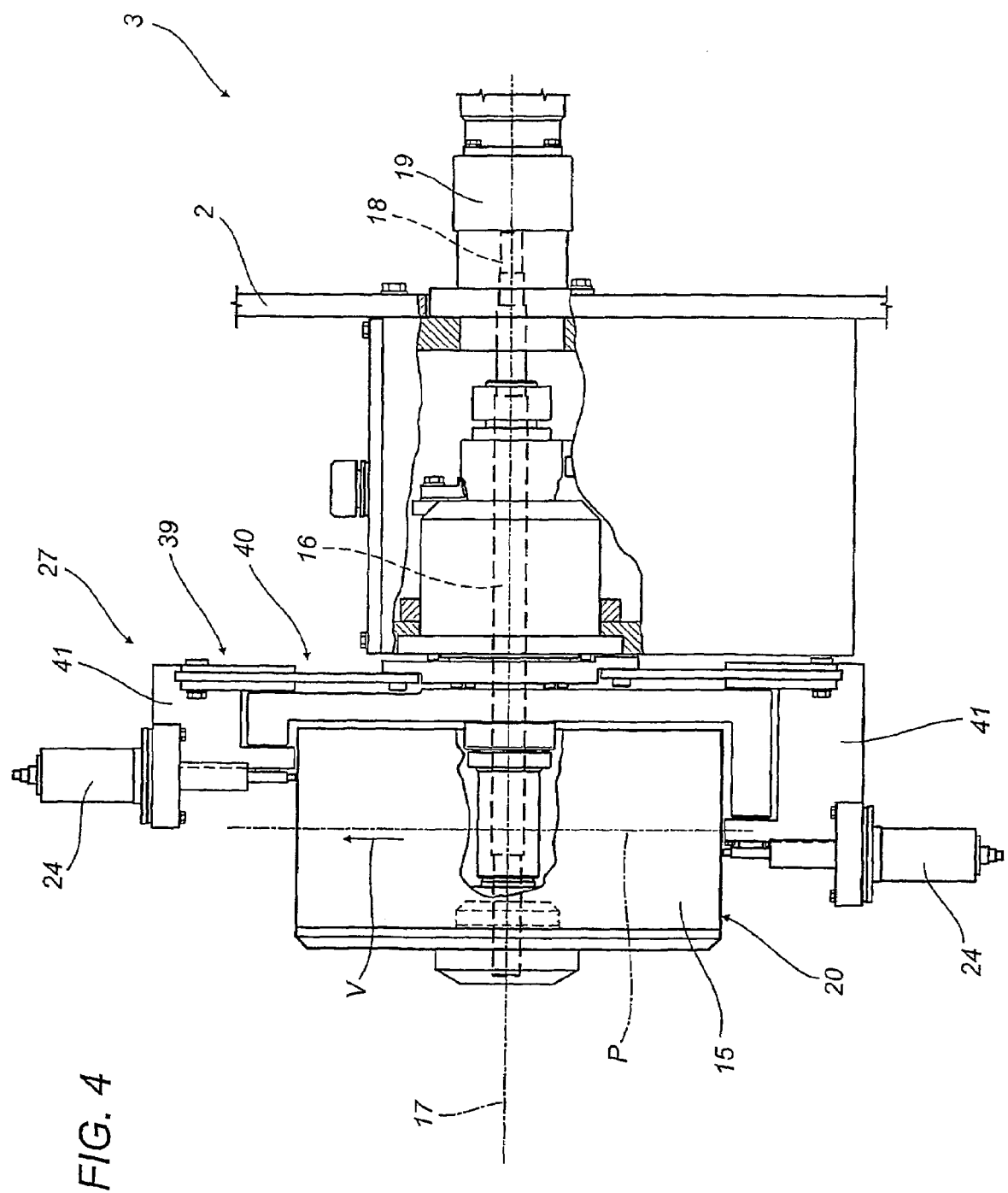
FIG. 4 is a schematic side view, partly in cross section and with some parts cut away for clarity, of the operating unit of FIG. 3.

The source of motion 18 is defined by the output shaft of a motor 19 illustrated schematically as a block in FIG. 4.

As illustrated in more detail in FIGS. 3 and 2, the drum 15 is laterally delimited by a substantially cylindrical peripheral surface 20 that defines a conveying path P along which the following are located in an upstream to downstream direction according to the direction of rotation V: a station 21 for feeding a succession of the tags 6 to the path P; a station 22 for feeding the tie string 7 to the path P; a station 23 for arranging the tie string 7 according to a defined pattern on the path P; a first sealer 24 facing the peripheral surface 20; a station 25 for feeding the flat filter paper web 5 to the path P; and a set of three more sealers 24 facing the peripheral surface 20 and distributed along a section T of the path P along which the web 5 is conveyed, with the tags 6 and the tie string 7 placed between the peripheral surface 20 and the web 5 itself.

The sealers 24 each have an ultrasound sealing section, or alternatively a heat sealing section or a laser sealing section, and are actuated by a shared drive device 27 that imparts to them simultaneous, synchronous movements, which are substantially the same, to and from an operational sealing position where the sealing sections of the sealers 24 are located along the path P.

The station 21 for feeding the tags 6 includes a device 21a for feeding and transversely cutting the tape 12 and which, after cutting the tape 12, transfers the tags 6 to respective suction portions 20a uniformly distributed along the path P around the peripheral surface 20 of the drum 15.

The device 21a transfers the tags 6 to the respective portions 20a at a synchronous rate relative to the speed of rotation of the drum 15.

The device 21a and the method by which suction is applied to the portions 20a are very well known to experts in the trade and do not require further explanation.

The station 23 includes a string placer device 23a of known type that does not strictly form part of the present invention.

The device 23a forms the aforementioned pattern in conjunction with a plurality of pins 28 (FIG. 2) that protrude cyclically, through respective holes made in the peripheral surface 20.

The position of the pins 28 on the peripheral surface 20 and the configuration of the tie string pattern are illustrated in FIG. 7.

Figure 5:
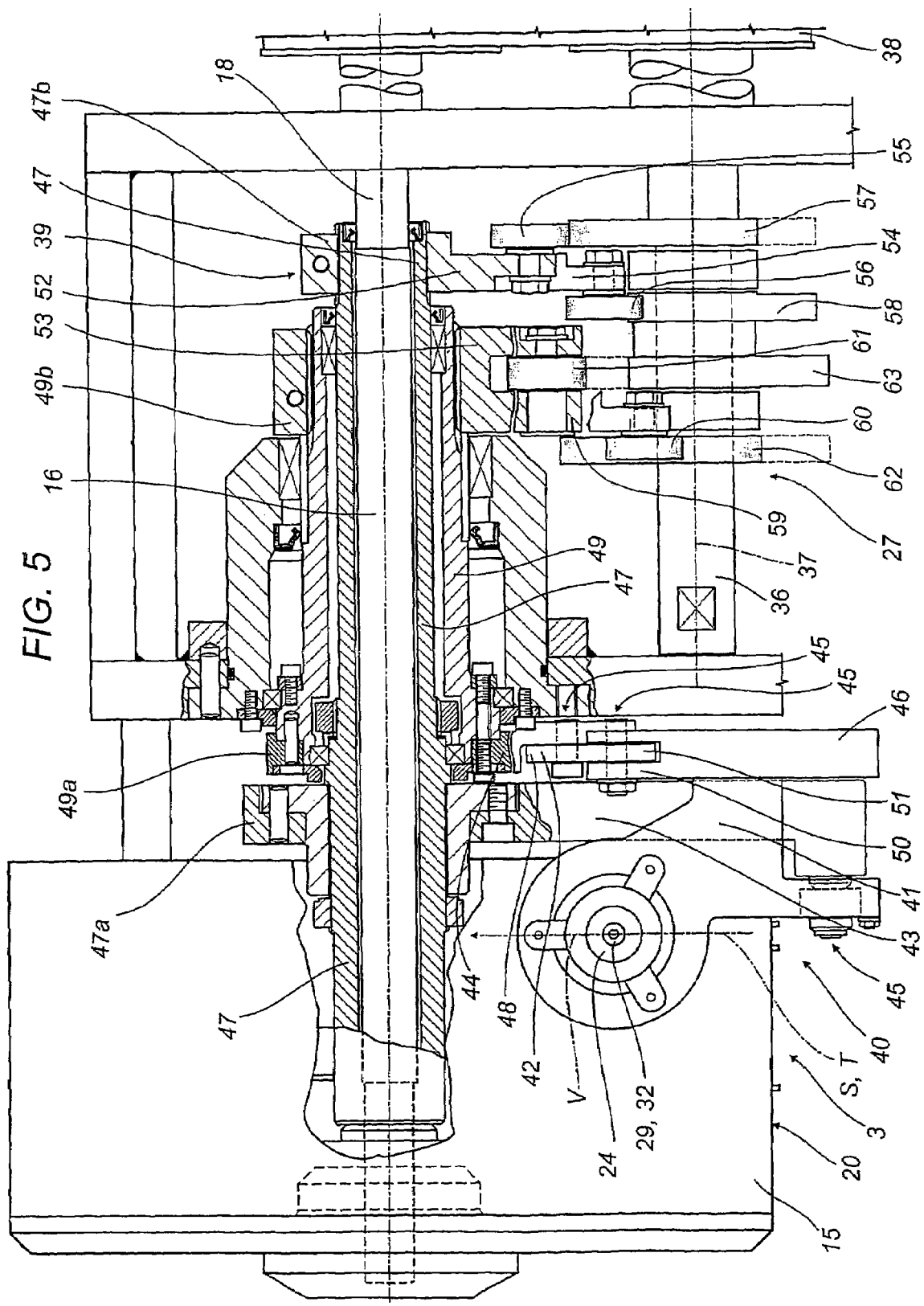
FIG. 5 is another schematic side view, also partly in cross section, of the operating unit illustrated in FIGS. 2 to 4.

As shown in FIGS. 3 and 5, the first sealer 24 has a twin sealing head 29 that faces the path P and is designed to attach the tie string 7, arranged according to the aforementioned pattern, to the tag 6 at two points 30 and 31 shown in FIG. 7; while each of the other sealers 24 of the set 26 has only one sealing head 32, also facing the path P, to attach the tie string 7, arranged according to the aforementioned pattern, and each tag 6 to the flat web of filter paper 5 at three points 33, 34 and 35, shown in FIG. 7.

The simultaneous action of the four sealers 24 is coordinated with the joint action of the tie string placer device 23a and of the pins 28, and precedes all the operations by which the web 5 is folded to form the filter bags 4.

The sealer 24 drive device 27 comprises a cam shaft 36 (FIG. 2). The shaft 36 has a central horizontal axis 37 and is also connected to the source of motion 18. More specifically, as shown FIG. 5, the axis 37 is parallel to the axis 17 of the shaft 16 and the latter is positioned next to the shaft 36.

The shaft 36 is kinematically linked to the shaft 16 and, more specifically, it is kinematically linked to the source of motion 18 through a belt 38 in such manner as to rotate about its axis 37 in synchronous relation with the rotation of the shaft 16 about the axis 17.

The drive device 27 further comprises a transmission element 39 positioned between the shaft 36 and the four sealers 24.

In FIG. 3, the transmission element 39, shared by all the sealers 24, comprises, for each sealer 24, a four-bar linkage 40 driven by the shaft 36 to move the twin head 29 of the first sealer 24 and the single heads 32 of the other sealers 24 of the set 26 along a respective closed path C including a sealing section S that substantially coincides with the path P and a return section R extending outside the path P. The paths C are all substantially the same.

As illustrated in FIGS. 3 and 5, each four-bar linkage 40 comprises a first link rod 41 mounting the respective sealer 24, a second link rod 42 and two cranks 43, 44, all linked to each other in chain-like fashion by three cylindrical hinges 45 whose axes are parallel to the axes 17 and 37 so as to impart planar motion.

More specifically, the crank 43 is rotatably coupled, at one end, to a first end 46 of the first link rod 41 through a first hinge 45 and, at the other end, is supported by a sleeve 47 of the transmission element 39 coupled coaxially and rotatably to the shaft 16.

The crank 44 is rotatably coupled, at one end, to a first end 48 of the second link rod 42 through a second hinge 45 and, at the other end, is supported by a sleeve 49 of the transmission element 39 coupled coaxially and rotatably to the shaft 16.

The first link rod 41 and the second link rod 42 are hinged to each other through the third hinge 45 at respective second ends 50, 51 opposite the aforementioned first ends 46, 48.

The sleeve 49 is coupled coaxially and rotatably to the shaft 16 through the sleeve 47 which is positioned between the shaft 16 and the sleeve 49 and which is in turn coupled coaxially and rotatably to both the sleeve 49 and to the shaft 16.

The sleeves 47, 49 support the four cranks 43 radially in a fan-like configuration, and the four cranks 44 along respective first crown wheels 47a, 49a peripherally positioned close to the drum 15. In this way, the cranks 43 are rotatable about the axis 17 and simultaneously oscillate about the latter under the driving action of the shaft 36, as described in more detail below.

Similarly, the cranks 44 are rotatable about the axis 17 and oscillate about the axis 17 simultaneously, but independently of the cranks 43, under the driving action of the shaft 36.

As shown in FIG. 5, the sleeves 47, 49 radially support respective arms 52 and 53, respectively along second peripheral crown wheels 47b, 49b positioned on the side coaxially opposite the corresponding first crown wheels 47a, 49a.

The arm 52 has a radial end 54 that is fork-shaped and supports two follower rollers 55, 56 coupled with respective cams 57, 58 on the shaft 36. More specifically, the roller 55 and the cam 57 operate together, as the shaft 36 rotates, in such a way that all the sealers 24, supported and driven by the corresponding four-bar linkages 40 are moved simultaneously in the direction V, while the roller 56 and the cam 58 operate together, as the shaft 36 rotates, in such a way that the sealers 24 are moved simultaneously in the opposite direction to the direction V.

The arm 53 has a radial end 59 that is fork-shaped and supports two follower rollers 60, 61 coupled with respective cams 62, 63 on the shaft 36.

More specifically, the roller 60 and the cam 62 operate together, as the shaft 36 rotates, in such a way that all the sealers 24, supported and driven by the corresponding four-bar linkages 40 are moved simultaneously towards the peripheral surface 20, while the roller 61 and the cam 63 operate together, as the shaft 36 rotates, in such a way that the sealers 24 are moved simultaneously away from the peripheral surface 20.

The four cams 57, 58, 62, 63 cause the four sealers 24 to move simultaneously and synchronously along the respective paths C and are shaped in such a way that the motion of each sealing head 29, 32 along the respective sealing section S is synchronous with the motion of the peripheral surface 20 of the drum 15 along the path P.

In other words, each sealer 24 is moved progressively towards the peripheral surface 20, then, during the sealing step, follows the peripheral surface 20 in the direction V and, lastly, is moved progressively away from the peripheral surface 20 along the section R returning to its starting position.

Downstream of the drum 15, the operating unit 3 comprises a station 64 for forming the filter bags 4 from the flat filter paper web 5 to which the tags 6 and tie string 7 have already been applied as described above and as illustrated in FIG. 7.

The station 64 receives the infusion product from a customary feed unit 65 (for example a hopper) and once the filter bags have been formed, transfers them to a packaging unit 66 also of customary type.

The units 65 and 66 of the machine 1 do not form part of the present invention and, therefore, fall outside the scope of this specification.

The operation of the unit 3 forming an integral part of the machine 1 may be easily inferred from the above description, and, more specifically, comprises the steps of: conveying the flat web 5 of filter paper along the path P; feeding a succession of the tags 6 to the path P; feeding the tie string 7 to the path P; arranging the tie string 7 according to the aforementioned defined pattern on the path P; attaching the tie string 7, arranged according to said pattern, and the tags 6 to each other and to the flat web 5 of filter paper by sealing; and lastly, forming, that is to say, completing, the filter bags 4 from the flat web 5 of filter paper to which the tags 6 and tie string 7 have already been applied.

It should be observed that the step of attaching the tie string 7, arranged according to the aforementioned pattern, and the tags 6 to the flat web 5 of filter paper is performed before the web is folded to actually form the filter bags 4, thus simplifying the subsequent sealing operations and, in particular, simplifying the operation of the sealer 24 drive device 27, and enabling it to have a more compact structure.

This simplification, together with the reduced size of the device 27, derives from the fact that the latter provides the simultaneous, synchronous motion for all the sealers 24 through a single transmission element 39 and a single cam shaft 36 which receives drive motion from the same source 18 as the drum 15.

This solution, although designed in particular for a machine that makes pyramidal filter bags where its advantages, according to the foregoing description, are certainly more evident, can also be applied to other types of filter bag making machines.

Thus, the present invention can advantageously be used for other types of filter bags, especially other types of three-dimensional filter bags, but also the more familiar, traditional filter bags of substantially flattened shape with single or double chamber, permitting a reduction of the overall dimensions of the machine and improving the precision of application of tag and tie string.

It will be understood that the invention described can be modified and adapted in several ways without thereby departing from the scope of the inventive concept. Moreover, all the details of the invention may be substituted by technically equivalent elements.

The invention claimed is:

1. A machine for making filter bags for infusion products, each filter bag being made from a flat web of filter paper and having applied to it a tag and a tie string connecting the tag to the filter bag, wherein the machine comprises:
   conveyor means for feeding the flat web of filter paper along at least part of a first path defined by the conveyor means;
   a first drive shaft for imparting rotary motion to the conveyor means;
   a first station for feeding the flat web of filter paper to the first path;
   a second station for feeding a succession of the tags to the first path;
   a third station for feeding the tie string to the first path;
   a fourth station for arranging the tie string according to a defined pattern on the first path;
   sealing means facing the first path and designed to attach the tie string, arranged according to said pattern, and the tags to each other and to the flat web of filter paper by sealing;
   a drive device for imparting to the sealing means a defined motion towards and away from a sealing position;
   a source of motion shared by the first drive shaft and the drive device;
   a station for forming the filter bags from the flat web of filter paper to which the tags and tie string have already been applied;
   a second drive shaft connected to the shared source of motion;
   a transmission element positioned between the second drive shaft and the sealing means,
   wherein said seating means comprises a plurality of sealers positioned along the first path and each having a sealing end facing the first path; the transmission element being shared by all the sealers in order to move the respective sealing end along a respective second closed path comprising a sealing section that substantially coincides with the first path and a return section extending outside the first path.

2. The machine according to claim 1, wherein the first and second drive shafts are kinematically linked to each other in such a way as to rotate about a first and a second central axis, which are parallel to each other.

3. The machine according to claim 1, wherein the conveyor means comprises a revolving drum mounted coaxially on the first drive shaft to rotate about the first axis.

4. The machine according to claim 1, wherein the second drive shaft is a cam shaft.

5. The machine according to claim 4, wherein the transmission element is shared by all the sealers and comprises, for each sealer, a four-bar linkage driven by the cam shaft to move the respective sealing end along the respective second closed path.

6. The machine according to claim 5, wherein the second closed paths are substantially the same; the motion of the sealing ends along the respective second closed paths being defined by a simultaneous, synchronous movement of all the sealers, and the motion of the sealing ends along the respective sealing sections follows the motion of the conveyor means along the first path.

7. The machine according to claim 5, wherein the four-bar linkage comprises a first link rod mounting the respective sealer, a second link rod and two cranks; the first crank being rotatably coupled, at one end, to a first end of the first link rod and, at the other end, being mounted rotatably about the first axis in such a way as to oscillate about the first axis under the driving action of the cam shaft; the second crank being rotatably coupled, at one end, to a first end of the second link rod and, at the other end, being mounted rotatably about the first axis in such a way as to oscillate about the first axis under the driving action of the cam shaft; the first and second link rods being hinged to each other at respective second ends opposite the respective first ends.

8. The machine according to claim 7, wherein the transmission element comprises a first sleeve coupled coaxially and rotatably to the first drive shaft; the first sleeve mounting the first cranks on the side opposite the first link rods and along a first peripheral crown wheel of the first sleeve.

9. The machine according to claim 8, wherein the transmission element comprises a first arm mounted on the first sleeve along a second peripheral crown wheel of the first sleeve and extending radially from the first sleeve; the first arm having a radial end mounting at least one follower roller coupled with a respective cam on the cam shaft.

10. The machine according to claim 9, wherein the radial end of the first arm is fork shaped and mounts two follower rollers each coupled to a respective cam on the cam shaft.

11. The machine according to claim 8, wherein the transmission element comprises a second sleeve coupled coaxially and rotatably to the first drive shaft; the second sleeve mounting the second cranks on the side opposite the second link rods and along a first peripheral crown wheel of the second sleeve.

12. The machine according to claim 11, wherein the second sleeve is coupled coaxially and rotatably to the first drive shaft through the first sleeve; the first sleeve being positioned between the first drive shaft and the second sleeve and being coupled coaxially and rotatably to the second sleeve.

13. The machine according to claim 11, wherein the transmission element comprises a second arm mounted by the second sleeve along a second peripheral crown wheel of the second sleeve and extending radially from the second sleeve; the second arm having a radial end mounting at least one follower roller coupled with a respective cam on the cam shaft.

14. The machine according to claim 13, wherein the radial end of the second arm is fork shaped and mounts two follower rollers each coupled to a respective cam on the cam shaft.

15. The machine according to claim 5, wherein the sealers each comprise a heat sealing section.

16. The machine according to claim 5, wherein the sealers each comprise an ultrasound sealing section.

* * * * *